(12) United States Patent
Caverno et al.

(10) Patent No.: US 11,891,295 B2
(45) Date of Patent: Feb. 6, 2024

(54) SYSTEMS AND METHODS FOR ACCURATELY TRACKING WATER CONSUMPTION FROM A LIQUID DISPENSER

(71) Applicant: Haier US Appliance Solutions, Inc., Wilmington, DE (US)

(72) Inventors: Katherine Caverno, Louisville, KY (US); Santhosh William, Fisherville, KY (US); Kelsey King, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 213 days.

(21) Appl. No.: 17/507,227

(22) Filed: Oct. 21, 2021

(65) Prior Publication Data

US 2023/0127059 A1    Apr. 27, 2023

(51) Int. Cl.
| | | |
|---|---|---|
| *B67D 1/08* | (2006.01) |
| *G05B 15/02* | (2006.01) |
| *F25D 23/12* | (2006.01) |
| *G06V 40/10* | (2022.01) |
| *G06V 40/13* | (2022.01) |
| *G06F 3/0488* | (2022.01) |
| *G06V 40/12* | (2022.01) |
| *G06F 18/22* | (2023.01) |

(52) U.S. Cl.
CPC .......... *B67D 1/0888* (2013.01); *F25D 23/126* (2013.01); *G05B 15/02* (2013.01); *G06F 3/0488* (2013.01); *G06F 18/22* (2023.01); *G06V 40/10* (2022.01); *G06V 40/13* (2022.01); *G06V 40/1365* (2022.01)

(58) Field of Classification Search
None
See application file for complete search history.

(56) References Cited

U.S. PATENT DOCUMENTS

| | | | | |
|---|---|---|---|---|
| 6,131,399 | A | * | 10/2000 | Hall ........................ G07F 9/105 |
| | | | | 62/250 |
| 7,673,661 | B2 | * | 3/2010 | Chase ................... F25D 23/126 |
| | | | | 250/221 |
| 7,869,901 | B2 | | 1/2011 | Johnson |

(Continued)

FOREIGN PATENT DOCUMENTS

| | | |
|---|---|---|
| CN | 106805767 A | 6/2017 |
| CN | 206273226 U | 6/2017 |

(Continued)

OTHER PUBLICATIONS

Wang et al., "Synthetic Data Generation and Adaption for Object Detection in Smart Vending Machines", Apr. 2019, IEEE. (Year: 2019).*

(Continued)

*Primary Examiner* — Mohammad Ali
*Assistant Examiner* — Kelvin Booker
(74) *Attorney, Agent, or Firm* — Dority & Manning, P.A.

(57) ABSTRACT

A method of tracking liquid consumption includes receiving an input from a user to dispense liquid from a liquid dispenser, determining an identity of the user, determining a volume of liquid dispensed from the dispenser, and confirming that the correct user is consuming the dispensed liquid.

17 Claims, 3 Drawing Sheets

(56) References Cited

U.S. PATENT DOCUMENTS

| | | | | |
|---|---|---|---|---|
| 8,245,735 | B2* | 8/2012 | Chase | B67D 1/001 |
| | | | | 141/141 |
| 8,666,683 | B2* | 3/2014 | Rogers | G01M 3/2892 |
| | | | | 702/45 |
| 8,972,048 | B2* | 3/2015 | Canora | G07F 9/001 |
| | | | | 700/240 |
| 9,422,146 | B2* | 8/2016 | Rogers | B67D 7/3281 |
| 9,638,461 | B2* | 5/2017 | Wait | B67D 1/0014 |
| 9,878,897 | B2* | 1/2018 | Rogers | B67D 7/04 |
| 10,941,978 | B2 | 3/2021 | Scalf | |
| 10,953,343 | B2 | 3/2021 | Dorfman | |
| 10,955,187 | B2 | 3/2021 | Scalf | |
| 11,427,459 | B2* | 8/2022 | Jansen | F25D 23/126 |
| 2002/0084322 | A1* | 7/2002 | Baric | G07F 13/025 |
| | | | | 235/381 |
| 2007/0235533 | A1* | 10/2007 | Giordano | G06Q 20/18 |
| | | | | 235/383 |
| 2010/0108755 | A1* | 5/2010 | Fuerstenberg | G06Q 20/40 |
| | | | | 235/375 |
| 2010/0125362 | A1* | 5/2010 | Canora | G06Q 20/327 |
| | | | | 235/487 |
| 2010/0155415 | A1* | 6/2010 | Ashrafzadeh | F25C 5/22 |
| | | | | 62/340 |
| 2011/0040503 | A1* | 2/2011 | Rogers | B67D 7/16 |
| | | | | 702/55 |
| 2013/0312872 | A1* | 11/2013 | Tobbe | B67D 1/1236 |
| | | | | 141/98 |
| 2014/0316723 | A1* | 10/2014 | Rogers | G01M 3/2815 |
| | | | | 702/55 |
| 2016/0214852 | A1* | 7/2016 | Collins | B67D 7/3281 |
| 2016/0314445 | A1* | 10/2016 | Geigel | G07F 9/026 |
| 2016/0314448 | A1* | 10/2016 | Geigel | G06Q 20/3224 |
| 2020/0126171 | A1* | 4/2020 | Jabara | G06Q 20/3278 |
| 2020/0372456 | A1* | 11/2020 | Anido | G06Q 10/087 |
| 2021/0032089 | A1* | 2/2021 | Jansen | F25D 23/126 |
| 2022/0325946 | A1* | 10/2022 | Schroeder | H04N 7/188 |

FOREIGN PATENT DOCUMENTS

| | | |
|---|---|---|
| CN | 108065778 A | 5/2018 |
| CN | 112205872 A | 1/2021 |
| KR | 20180025039 A | 3/2018 |

OTHER PUBLICATIONS

Lee et al., "Vision-Based Finger Action Recognition by Angle Detection and Contour Analysis", Jun. 2010, ETRI Journal, vol. 33, No. 3, Jun. 2011. (Year: 2010).*

Dorrer et al., "Comparison of the YOLOv3 and Mask R-CNN architectures' efficiency in the smart refrigerator's computer vision", 2020, J. Phys.: Conf. Ser. 1679 042022 (Year: 2020).*

Zhang et al., "Toward New Retail: A Benchmark Dataset for Smart Unmanned Vending Machines", 2019, IEEE Transactions On Industrial Informatics, vol. 16, No. 12, Dec. 2020. (Year: 2019).*

Ahmed et al., "Implementation of Smart Refrigerator based on Internet of Things", Dec. 2019, International Journal of Innovative Technology and Exploring Engineering (IJITEE), ISSN: 2278-3075, vol. 9 Issue-2, Dec. 2019. (Year: 2019).*

* cited by examiner

FIG. 3 ated with the dispenser). It will be understood that other suitable arrangements (not illustrated) for the dispenser assembly may be used without departing from the scope of the present disclosure.

SYSTEMS AND METHODS FOR ACCURATELY TRACKING WATER CONSUMPTION FROM A LIQUID DISPENSER

FIELD OF THE INVENTION

The present subject matter relates generally to refrigerator appliances, and more particularly to tracking dispensation from liquid dispensers of refrigerator appliances.

BACKGROUND OF THE INVENTION

Refrigerator appliances store various items such as food items and medicines in cool temperatures to prevent spoilage. Recently, refrigerator appliances have begun incorporating additional features for convenience of home users. For instance, many refrigerator appliances include liquid (water) dispensers in a door thereof, through which a user may easily obtain water for consumption that is prechilled. Moreover, many refrigerator appliances are incorporating smart features, such as internet connectivity, communication with other smart appliances, and tracking of certain features.

Further, many users of refrigerator appliances, and in particular water dispensers, are becoming more health conscious. For instance, many users have applications through which they may track certain dietary information, such as water consumption. Some conventional refrigerator appliances can notify the user as to an amount of water dispensed from the water dispenser. However, the user is left to manually enter in the information into a separate application to accurately record the amount of water ingested. Moreover, the user obtaining the water from the dispenser may not be the same user that is consuming the water.

Accordingly, a refrigerator appliance including a liquid dispenser that obviates one or more of the above-mentioned features would be beneficial. In particular, a refrigerator appliance incorporating more accurate hydration tracking would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of tracking liquid consumption from a refrigerator appliance is provided. The method may include receiving an input from a user to initiate a liquid dispensing operation from the dispenser; determining an identity of the user providing the input, the user being a first user among a group of users; performing the liquid dispensing operation to dispense a volume of liquid; and displaying a first prompt to the first user in response to performing the liquid dispensing operation, the first prompt comprising a request to confirm that the volume of dispensed liquid is intended for the first user.

In another exemplary aspect of the present disclosure, a computing system for tracking liquid consumption is provided. The computing system may include a liquid dispenser configured to selectively dispense a liquid therefrom; a flow meter provided at the liquid dispenser, the flow meter detecting an amount of liquid dispensed from the liquid dispenser; and a controller operably coupled to the liquid dispenser and the flow meter, wherein the controller is configured to perform a series of operations. The series of operations may include receiving an input from a user to initiate a liquid dispensing operation from the dispenser; determining an identity of the user providing the input, the user being a first user among a group of users; performing the liquid dispensing operation to dispense a volume of liquid; determining a volume of liquid dispensed by the dispenser; and displaying a first prompt to the first user in response to determining the volume of liquid dispensed, the first prompt comprising a request to confirm that the volume of liquid dispensed is intended for the first user.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
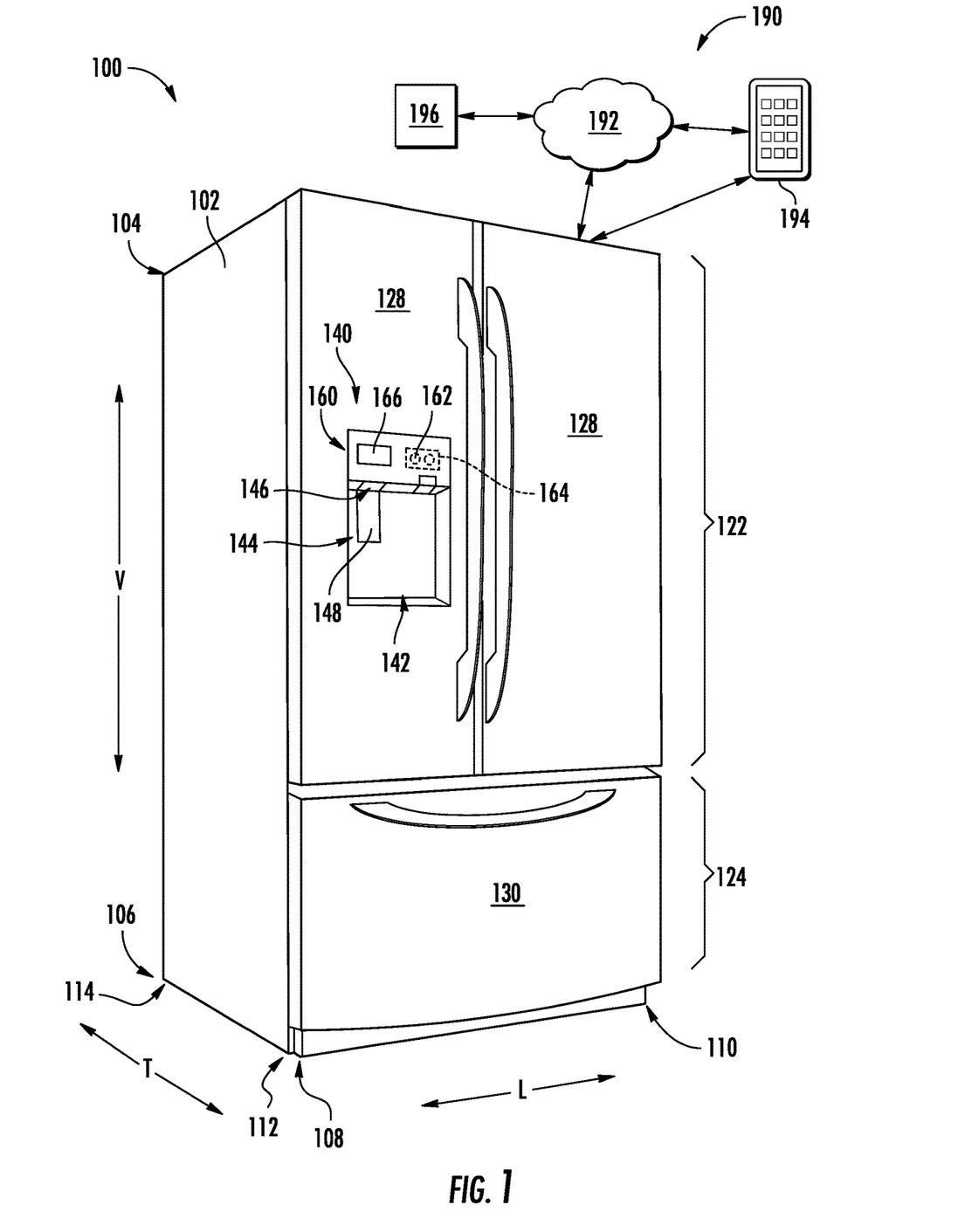
FIG. 1 provides a perspective view of a refrigerator appliance including a dispensing assembly according to an exemplary embodiment of the present subject matter.

FIG. 1 provides a perspective view of a refrigerator appliance 100 according to an exemplary embodiment of the present subject matter. Refrigerator appliance 100 includes a cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Cabinet 102 defines chilled chambers for receipt of food items for storage. In particular, cabinet 102 defines fresh food chamber 122 positioned at or adjacent top 104 of cabinet 102 and a freezer chamber 124 arranged at or adjacent bottom 106 of cabinet 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance (e.g., when a dispenser assembly (described below) is available on the appliance). Consequently, the description set forth herein is for illustrative purposes only and is not intended to be limiting in any aspect to any particular refrigerator chamber configuration.

Refrigerator doors 128 are rotatably hinged to an edge of cabinet 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

A dispensing assembly 140 will now be described according to exemplary embodiments of the present subject matter. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142.

By contrast, inside refrigerator appliance 100, refrigerator door 128 may define an icebox housing an icemaker and an ice storage bin that are configured to supply ice to dispenser recess 142. In this regard, for example, the icebox may define an ice making chamber for housing an ice making assembly, a storage mechanism, and a dispensing mechanism.

A control panel 160 is provided for controlling the mode of operation. For example, control panel 160 includes one or more selector inputs 162, such as knobs, buttons, touchscreen interfaces, etc., such as a water dispensing button and an ice-dispensing button, for selecting a desired mode of operation such as crushed or non-crushed ice. In addition, inputs 162 may be used to specify a fill volume or method of operating dispensing assembly 140. In this regard, inputs 162 may be in communication with a processing device or controller 164. Signals generated in controller 164 operate refrigerator appliance 100 and dispensing assembly 140 in response to selector inputs 162. Additionally, a display 166, such as an indicator light or a screen, may be provided on control panel 160. Display 166 may be in communication with controller 164 and may display information in response to signals from controller 164.

Figure 2:
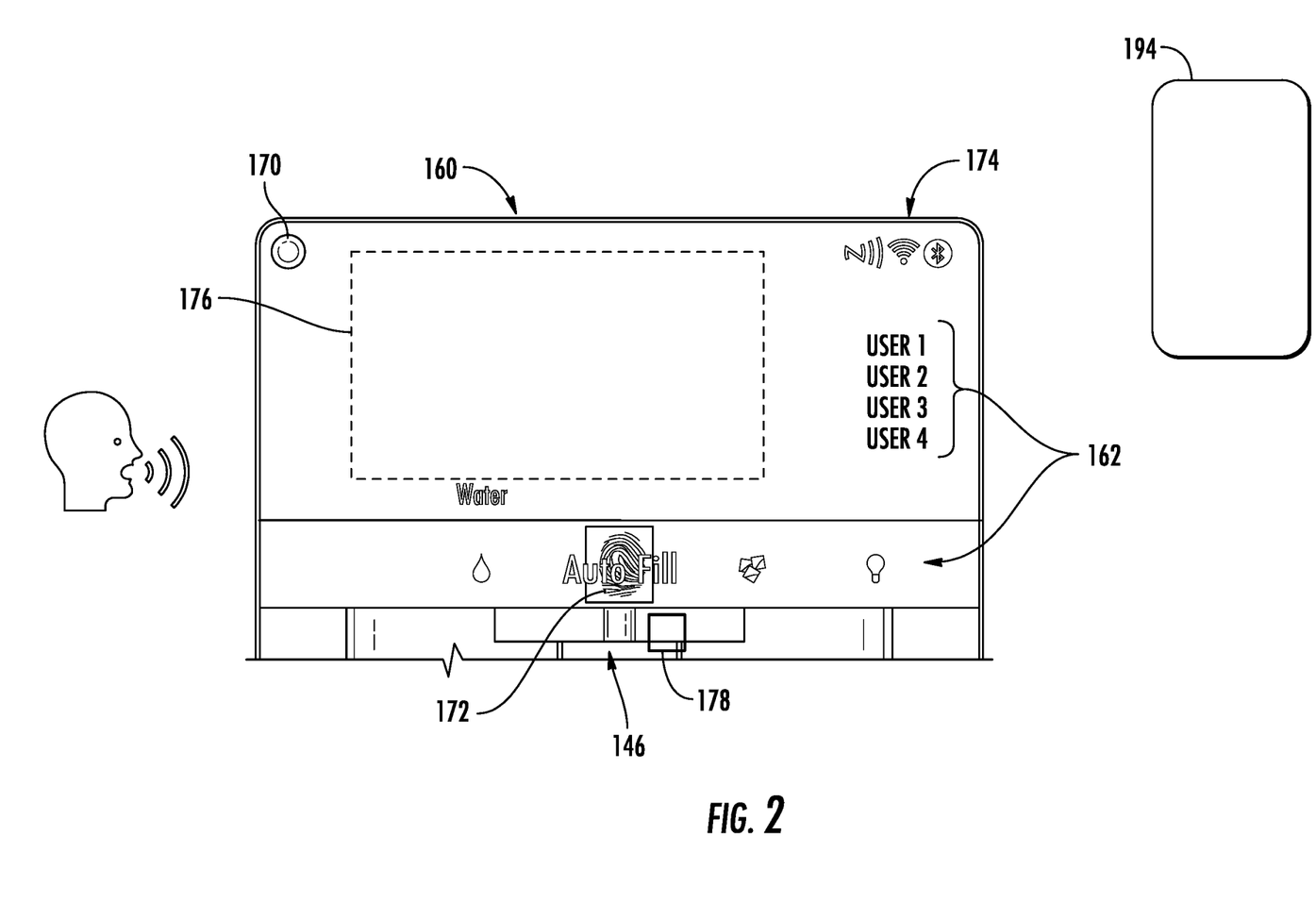
FIG. 2 provides a front view of the dispensing assembly of FIG. 1.

Referring now generally to FIG. 2, control panel 160 may include additional controls or inputs. For at least one example, control panel 160 include a camera 170 provided therein. Camera 170 may be configured to obtain images external to refrigerator appliance 100. In detail, camera 170 may face outward from control panel 160 and selectively obtain or capture images of users or objects in front of or adjacent to refrigerator appliance 100. It should be appreciated that camera 170 may include any suitable number, type, size, and configuration of camera(s) for obtaining images. In general, camera 170 may include a lens which may otherwise be positioned behind a separate clear cover. So positioned, camera 170 may obtain one or more images or videos of an area in front of or around refrigerator appliance 100, as described in more detail below. Camera 170 may then transmit the obtained images to controller 164.

Control panel 160 may include a fingerprint scanner 172. For instance, fingerprint scanner 172 may be positioned on a surface of control panel 172 and may be configured to recognize and/or analyze the fingerprint (or thumbprint) of one or more users. Fingerprint scanner 172 may be any suitable or known type or style of scanner, including an optical scanner, a capacitive scanner, an ultrasonic scanner, a thermal scanner, or the like. Moreover, fingerprint scanner 172 may be a stagnant touch scanner (e.g., static touch), a moving touch scanner (e.g., dynamic swipe touch), or the like. Fingerprint scanner 172 may transmit the scanned fingerprint(s) to controller 164 for analysis and storage.

Control panel 160 may include a wireless connection module 174. For instance, wireless connection module 174 may facilitate a remote connection with, for example, consumer device 194. In some embodiments, wireless connection module is a near field communication module (e.g., separate from a network connection module, described below). Additionally or alternatively, wireless connection module 174 may allow refrigerator appliance 100 to establish connections with one or more remote devices. For instance, wireless connection module 174 may establish connections with multiple remote devices. The remote devices may include mobile phone devices, smart watch devices, other wearable smart devices, mobile tablets, laptop computers, or the like. The remote connections will be explained in more detail below with respect to an external communication system 190.

Control panel 160 may include a display screen 176 formed thereon. Display screen 176 may be separate and different from display 166. For instance, display screen 176 may be a digital display, such as a liquid crystal display (LCD), a light emitting diode display (LED), or the like. Display screen 176 may selectively present various information relating to refrigerator appliance 100 or dispensing assembly 140. For instance, display screen 176 may optionally display a temperature within fresh food chamber 122 and freezer chamber 124, an operational status of dispensing assembly 140, an amount or volume of liquid (e.g., water) dispensed from dispensing assembly 140, various profile attributes of one or more users registered to the device, etc. Display screen 176 may receive inputs from controller 164, including information or data to display and when to turn on and/or off.

Dispensing assembly 140 may include a flow meter 178. Flow meter may be a device or sensor configured to measure, sense, calculate, or otherwise determine an amount or volume of liquid (e.g., water) that is dispensed from dispensing assembly 140. For instance, flow meter 178 may determine an instant amount of liquid dispensed during a single dispensing operation, and/or may determine a total amount of liquid dispensed from dispensing assembly 140 over a predetermined amount of time (e.g., over days, weeks, months, etc.). Flow meter 178 may then transmit the data including the volume of liquid dispensed to controller 164.

As used herein, "processing device" or "controller" may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible by the processing device, including instructions that can be executed by the processing device. Optionally, the instructions can be software or any set of instructions and/or data that when executed by the processing device, cause the processing device to perform operations.

Referring back to FIG. 1, a schematic diagram of an external communication system 190 will be described according to an exemplary embodiment of the present subject matter. In general, external communication system 190 is configured for permitting interaction, data transfer, and other communications with refrigerator appliance 100. For example, this communication may be used to provide and receive operating parameters, cycle settings, performance characteristics, user preferences, user notifications, or any other suitable information for improved performance of refrigerator appliance 100.

External communication system 190 permits controller 164 of refrigerator appliance 100 to communicate with external devices either directly or through a network 192. For example, a consumer may use a consumer device 194 to communicate directly with refrigerator appliance 100. For example, consumer devices 194 may be in direct or indirect communication with refrigerator appliance 100, e.g., directly through a local area network (LAN), Wi-Fi, Bluetooth, Zigbee, etc. or indirectly through network 192. In general, consumer device 194 may be any suitable device for providing and/or receiving communications or commands from a user. In this regard, consumer device 194 may include, for example, a personal phone, a tablet, a laptop computer, or another mobile device.

In addition, a remote server 196 may be in communication with refrigerator appliance 100 and/or consumer device 194 through network 192. In this regard, for example, remote server 196 may be a cloud-based server 196, and is thus located at a distant location, such as in a separate state, country, etc. In general, communication between the remote server 196 and the client devices may be carried via a network interface using any type of wireless connection, using a variety of communication protocols (e.g., TCP/IP, HTTP, SMTP, FTP), encodings or formats (e.g., HTML, XML), and/or protection schemes (e.g., VPN, secure HTTP, SSL).

In general, network 192 can be any type of communication network. For example, network 192 can include one or more of a wireless network, a wired network, a personal area network, a local area network, a wide area network, the internet, a cellular network, etc. According to an exemplary embodiment, consumer device 194 may communicate with a remote server 196 over network 192, such as the internet, to provide user inputs, transfer operating parameters or performance characteristics, receive user notifications or instructions, etc. In addition, consumer device 194 and remote server 196 may communicate with refrigerator appliance 100 to communicate similar information.

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

Figure 3:
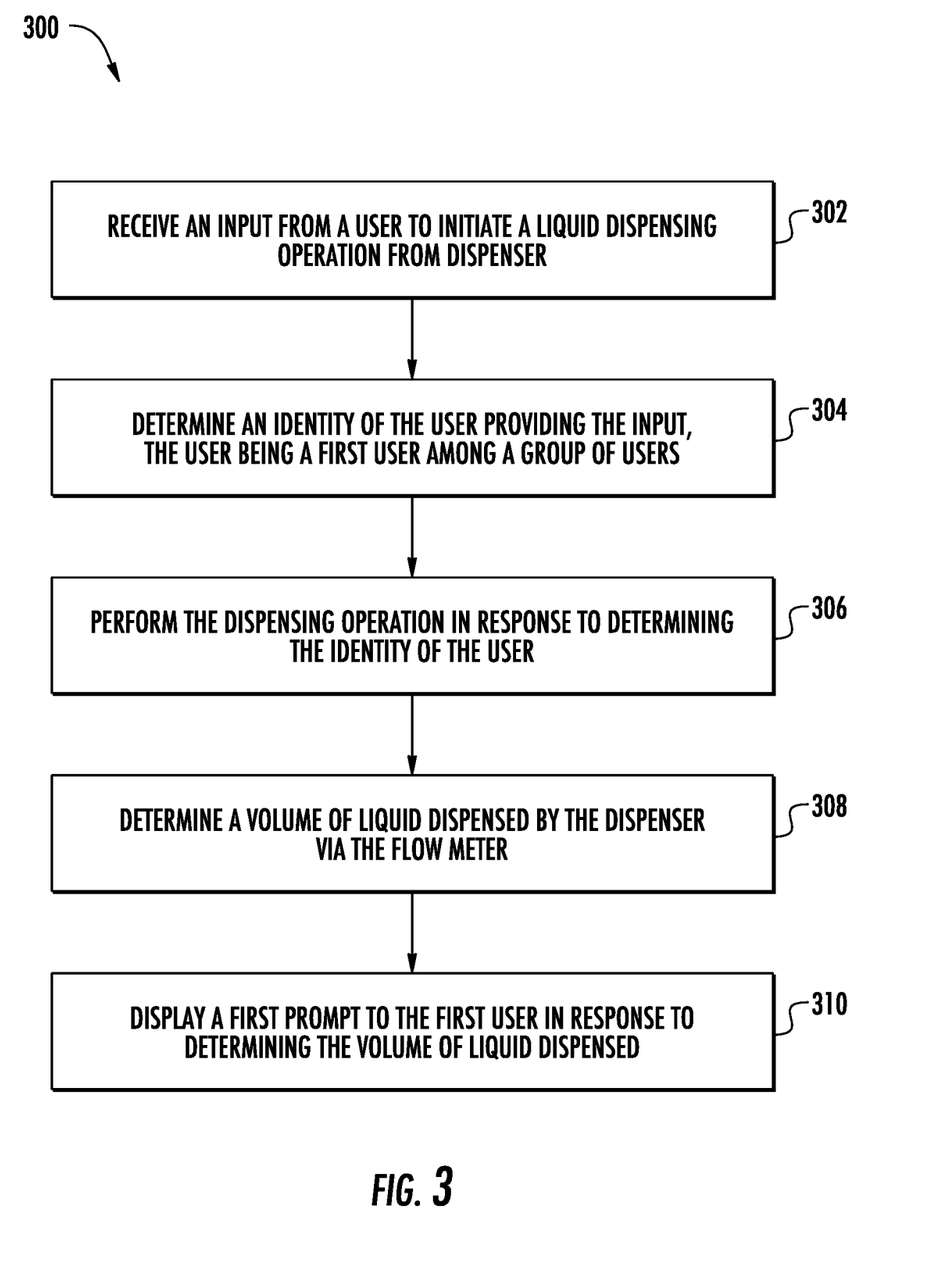
FIG. 3 provides a flow chart illustrating a method of operating a refrigerator appliance according to exemplary embodiments.

Referring now to FIG. 3, an exemplary method 300 of tracking liquid consumption from a refrigerator appliance (e.g., refrigerator appliance 100) will be described in detail. Although the discussion below refers to the exemplary method 300 of operating refrigerator appliance 100, one skilled in the art will appreciate that the exemplary method 300 is applicable to the operation of a variety of other refrigerator or liquid/beverage dispenser appliances, such as stand-alone beverage dispenser appliances. In exemplary embodiments, the various method steps as disclosed herein may be performed by controller 164 or a separate, dedicated controller. Further, the steps described herein may be performed in any suitable order, and the order presented herein is not limited. Moreover, additional steps may be included, and some presented steps may be omitted, as certain applications dictate.

In detail, users of the refrigerator appliance may regularly obtain water from the dispenser assembly. In some instances, a group of users (e.g., a family) may all use a single liquid dispenser assembly. Users may wish to track their consumption of water for health benefits, personal goals, or the like. Accordingly, users may maintain profiles to record and track their water consumption. In order to accurately track and maintain consumption for each user, determining which user will actually be consuming the dispensed water may be desirable. Thus, method 300 outlines a process to ensure that each dispensation is properly recorded and attributed to the correct user.

At step 302, method 300 may include receiving an input from a user to initiate a liquid dispensing operation from a liquid dispenser (e.g., dispensing assembly 140). In detail, a user, such as a first user from a group of users, may initiate a dispensing operation (e.g., by activating actuating mechanism 148). The dispensing operation may be a manual operation or an automatic operation, such as an auto-fill operation. For instance, the dispenser assembly may include an auto-fill feature which regularly and accurately dispenses a predetermined amount of liquid. Conversely, a user may press a button or paddle and dispense a desired amount of liquid into a container, such as a cup or glass.

At step 304, method 300 may include determining an identity of the user providing the input. It should be noted that step 304 may occur simultaneously or before step 302, as specific embodiments entail. In detail, the refrigerator appliance (e.g., the dispensing assembly) may perform one or more operations to determine the identity of the user requesting the liquid dispensation. As described above, the dispensing assembly may include one or more features which may determine a user's identity. According to some embodiments, one or more of these features may be used in the determination. Once one or more identification attributes have been obtained, the resulting data may be sent to a controller (e.g., controller 164) for analysis.

In one example, a camera (e.g., camera 170) is provided within the dispensing assembly. The camera may capture or obtain one or more images of the user (e.g., while the user is positioned in front of the dispensing assembly). The camera may then transmit the obtained image(s) to the controller for analysis. Thus, the controller may determine that the user providing the input to initiate the liquid dispensation is a first user (among the group of users, for example, a household family). For instance, the controller may include an image processing software. It should be appreciated that any suitable image processing or recognition method may be used to analyze the images captured and facilitate evaluation of one or more characteristics. In addition, it should be appreciated that this image analysis or processing may be performed locally (e.g., by controller 164) or remotely (e.g., by a remote server).

According to exemplary embodiments of the present subject matter, the analyzing of the one or more images may include analyzing the image(s) of the user using a neural network classification module and/or a machine learning image recognition process. In this regard, for example, the controller may be programmed to implement the machine learning image recognition process that includes a neural network trained with a plurality of images of the group of users. By analyzing the image(s) captured using this machine learning image recognition process, the controller may properly evaluate the one or more characteristics, e.g., by identifying the trained image that is closest to the obtained image.

As used herein, the terms image recognition process and similar terms may be used generally to refer to any suitable method of observation, analysis, image decomposition, feature extraction, image classification, etc. of one or more images or videos taken within a refrigerator appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by the camera and the controller may be programmed to perform such processes and take corrective action.

In another example, a fingerprint scanner (e.g., fingerprint scanner 172) is provided on or within the dispensing assembly. The user may press his or her finger onto the fingerprint scanner to establish identification. The fingerprint scanner may transmit the obtained fingerprint data to the controller for analysis. Similar to the camera software discussed above, the controller may analyze the obtained fingerprint via a trained neural network. The controller may compare the obtained fingerprint (e.g., features of the obtained fingerprint) against a database of acquired fingerprints. The controller may then match the obtained fingerprint with a stored fingerprint and determine the user as the first user, for example.

In another example, the user may identify him or herself via the control panel (e.g., control panel 160). For instance, one or more selections may be available on the control panel allowing the user to select a profile. The user may thus touch a button (e.g., a physical button, a virtual button, a touch screen, etc.) to associate the dispensation with a particular profile. Therefore, the controller may recognize the button input as the first user and temporarily associate the dispensed liquid with the first user.

In another example, the controller may establish a connection with a local remote device (e.g., via external communication network 190 or wireless connection module 174) upon receiving the input to initiate the liquid dispensing operation. In detail, in response to receiving the input, the controller may instruct the wireless connection module to search for a connectable device. As described above, the connectable device may be a mobile device (e.g., smart phone), a wearable device (e.g., a smart watch), or the like.

The wireless communication module may then establish a connection with the connectable device that is determined to be closest to the dispenser assembly. Upon establishing the connection, the controller may determine that the connectable device is associated with a particular user (e.g., the first user).

In yet another example, the controller may identify a user via a voice recognition software. For instance, the user may install a third-party voice activation software (e.g., Google® Home, Apple® Siri®, Amazon® Alexa®, Samsung® Bixby®, or the like) on the dispensing assembly, the remote device, or both. Thus, the user may initiate the liquid dispensing operation via a voice command. Upon analyzing the voice command, the controller may determine the identity of the user initiating the operation.

At step 306, method 300 may include performing the dispensing operation to dispense a volume of liquid. The dispensing operation may be performed in response to determining the identity of the user. In detail, the controller may instruct the dispensing assembly to perform the requested dispensing operation. As described above, the dispensing operation may include the manual fill or the automatic fill. Moreover, the controller may instruct a flow meter (e.g., flow meter 178) to begin sensing or measuring the amount or volume of liquid being dispensed.

At step 308, method 300 may include determining a volume of liquid dispensed by the identified dispenser. The volume of liquid dispensed may be determined via the flow meter. In detail, at the conclusion of the dispensing operation, the controller may determine a total amount or volume of liquid released or dispensed during the dispensing operation. For instance, utilizing a predefined algorithm, the controller may calculate the total volume of liquid released utilizing a known flow rate of the liquid, a time of dispensing (e.g., a total time a discharge outlet was in an open position), or the like. Additionally or alternatively, the controller may receive a recorded volume directly from the flow meter (e.g., if/when the flow meter is a sensor such as an optical sensor). Thus, the controller may store the volume of liquid dispensed, for example, in a temporary memory.

At step 310, method 300 may include displaying a first prompt to the identified user in response to determining the volume of liquid dispensed. In detail, at the conclusion of the dispensing operation, the controller may cause a display prompt to be displayed to the first user (or the identified user that initiated the dispensing operation). The prompt may be displayed to the identified user, for instance, at the dispensing assembly. For instance, a display (e.g., display screen 176) may display the prompt to the identified user directly from the dispensing assembly. In some embodiments, the controller may transmit the display prompt to a remote device, for example, the identified user's connected remote device.

As described above, the refrigerator appliance (or the dispensing assembly) may be remotely or wirelessly connected with one or more remote devices, such as cell phones, for example. Each remote device may have a mobile application (app) installed thereon to communicate specifically with the dispensing assembly. Thus, the controller (of the dispensing assembly) may transmit the information to the connected mobile device of the identified user (e.g., the first user). The prompt may then be displayed on the connected mobile device of the identified user.

The prompt may ask the identified user to confirm whether the dispensed liquid (e.g., the dispensed volume of liquid) is to be consumed by the identified user themselves. For instance, the prompt may display a question, such as "16 oz of water dispensed. Add to user profile?" The identified user may then have to option to select "yes" or "no." When "yes" is selected, the controller may assign the dispensed amount of liquid to the identified user's profile. The addition of the dispensed amount may be performed at the dispensing assembly or at the identified user's connected device. For example, a specified app may be installed at each of the dispensing assembly and the connected device. Thus, communication between the dispensing assembly and the connected device may be constant (e.g., when the connected device is wirelessly connected to the dispensing assembly). Additionally or alternatively, the dispensed amount (and each of the user's profiles) may be stored on a remote server (e.g., remote server 196).

According to some examples, the identified user that initiates the dispensation of liquid may not be the user that will consume the liquid. In detail, within a household, the first user may dispense the liquid into a container to deliver to a different user to consume. Accordingly, the prompt displayed to the identified user may ensure that the tracking and logging of hydration is accurate for each user.

Therefore, the first user (the identified user) may select "no" on the prompt when he or she does not intend to consume the dispensed liquid. The controller may then display a second prompt to the identified user. Similar to above, the prompt may be displayed at the dispenser assembly or on the identified user's connected device. The second prompt may allow the identified user to assign the dispensed volume to a different user. For example, the second prompt may include a list of each registered user within the group of users. The identified user may then select the appropriate user to which to assign the dispensed amount. Accordingly, more accurate tracking of hydration is maintained. The controller may then assign the dispensed amount to the selected profile.

According to the above-described embodiments, a system for tracking hydration or liquid consumption among a group of users is disclosed. The system may include a liquid dispenser, a flow meter, and a controller. The liquid dispenser may include a user interface including one or more means for determining an identity of a user initiating a dispensing operation. The one or more means may include a camera, a fingerprint sensor, a voice activation system, a manual selection panel, a near field communication module, or the like. The dispenser assembly may then perform the dispensing operation. Upon completion, the controller may determine a total amount of liquid dispensed by the dispenser assembly. The controller may then display a prompt to the identified user. The prompt may request a confirmation that the identified user intends to consume the dispensed liquid. If "no" is selected, the controller may then display a second prompt to the identified user. The second prompt may allow the identified user to select an alternate profile to which to assign the dispensed liquid amount. Accordingly, the system described herein may accurately track hydration and/or liquid consumption for multiple users, avoiding errant additions to wrong profiles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of tracking liquid consumption from a refrigerator appliance, the refrigerator appliance comprising a dispenser and a camera provided on an exterior surface of the refrigerator appliance, the method comprising:
receiving an input from a user to initiate a liquid dispensing operation from the dispenser;
determining an identity of the user providing the input, the user being a first user among a group of users, wherein determining the identity of the user comprises:
capturing, via the camera, an image of the user initiating the liquid dispensing operation;
comparing the captured image to a database of stored images; and
determining that the captured image matches a stored image from the database of stored images registered to the first user;
performing the liquid dispensing operation to dispense a volume of liquid;
determining a volume of liquid dispensed by the dispenser in response to performing the liquid dispensing operation; and
displaying a first prompt to the first user in response to performing the liquid dispensing operation, the first prompt comprising a request to confirm that the volume of dispensed liquid is intended for the first user.

2. The method of claim 1, further comprising:
determining that the dispensed liquid is not intended for the first user in response to displaying the first prompt; and
displaying a second prompt to assign the dispensed liquid to a different user from the group of users.

3. The method of claim 2, wherein the first prompt and the second prompt are displayed on a mobile device registered to the first user.

4. The method of claim 1, wherein the refrigerator appliance further comprises a fingerprint scanner, and wherein determining the identity of the user providing the input comprises:
receiving a fingerprint input via the fingerprint scanner from the user;
analyzing the fingerprint input by comparing the fingerprint input against a database of previously recorded fingerprints; and
determining that the fingerprint input is registered to the first user.

5. The method of claim 1, wherein the refrigerator appliance further comprises a user interface, and wherein determining the identity of the user providing the input comprises:
registering an input to the user interface designating the first user among the group of users.

6. The method of claim 5, wherein the user interface is a touch panel provided on the refrigerator appliance.

7. The method of claim 1, wherein the refrigerator appliance further comprises a near field communication module provided therein, and wherein determining the identity of the user providing the input comprises:
searching, via the near field communication module, for a connectable device in response to receiving the input from the user to initiate the liquid dispensing operation;
establishing a connection between the refrigerator appliance and the connectable device via the near field communication module; and
determining that the connectable device is registered to the first user.

8. The method of claim 7, wherein the connection between the refrigerator appliance and the connectable device is one of a Bluetooth connection, a near field connection, or a wireless fidelity connection.

9. A computing system for tracking liquid consumption, the computing system comprising:
a liquid dispenser configured to selectively dispense a liquid therefrom, the liquid dispenser comprising a camera provided on an exterior surface of the liquid dispenser;
a flow meter provided at the liquid dispenser, the flow meter detecting an amount of liquid dispensed from the liquid dispenser; and
a controller operably coupled to the liquid dispenser and the flow meter, wherein the controller is configured to perform a series of operations, the series of operations comprising:
receiving an input from a user to initiate a liquid dispensing operation from the dispenser;
determining an identity of the user providing the input, the user being a first user among a group of users, wherein determining the identity of the user comprises:
capturing, via the camera, an image of the user initiating the liquid dispensing operation;
comparing the captured image to a database of stored images; and
determining that the captured image matches a stored image from the database of stored images registered to the first user;
performing the liquid dispensing operation to dispense a volume of liquid;
determining a volume of liquid dispensed by the dispenser; and
displaying a first prompt to the first user in response to determining the volume of liquid dispensed, the first prompt comprising a request to confirm that the volume of liquid dispensed is intended for the first user.

10. The computing system of claim 9, wherein the series of operations further comprises:
determining that the dispensed liquid was not intended for the first user in response to displaying the first prompt; and
displaying a second prompt to assign the volume of liquid dispensed to a different user from the group of users.

11. The computing system of claim 10, wherein the first prompt and the second prompt are displayed on a mobile device registered to the first user.

12. The computing system of claim 9, wherein the liquid dispenser further comprises a user interface, and wherein determining the identity of the user providing the input comprises:
registering an input to the user interface designating the first user among the group of users.

13. The computing system of claim 12, wherein the user interface is a touch panel provided on the liquid dispenser.

14. The computing system of claim 9, wherein the liquid dispenser further comprises a near field communication module provided therein, and wherein determining the identity of the user providing the input comprises:
searching, via the near field communication module, for a connectable device in response to receiving the input from the user to initiate the liquid dispensing operation;

establishing a connection between the liquid dispenser and the connectable device via the near field communication module; and determining that the connectable device is registered to the first user.

15. The computing system of claim 14, wherein the connectable device is one of a mobile phone device, a smart watch, or a mobile tablet.

16. The computing system of claim 15, wherein the connection between the liquid dispenser and the connectable device is one of a Bluetooth connection, a near field connection, or a wireless fidelity connection.

17. The computing system of claim 11, wherein the liquid dispenser further comprises a fingerprint scanner, and wherein determining the identity of the user providing the input comprises:

receiving a fingerprint input via the fingerprint scanner from the user;

analyzing the fingerprint input by comparing the fingerprint input against a database of previously recorded fingerprints; and determining that the fingerprint input is registered to the first user.

\* \* \* \* \*